United States Patent
Liao

(10) Patent No.: US 9,487,155 B2
(45) Date of Patent: Nov. 8, 2016

(54) MANUFACTURING METHOD FOR A HANGING STRUCTURE OF A HANDS-FREE MOUNT

(71) Applicant: Cheng Uei Precision Industry Co., Ltd., New Taipei (TW)

(72) Inventor: Yi Ping Liao, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 279 days.

(21) Appl. No.: 14/226,793

(22) Filed: Mar. 26, 2014

(65) Prior Publication Data
US 2015/0273745 A1   Oct. 1, 2015

(51) Int. Cl.
| | | |
|---|---|---|
| *B29C 45/14* | (2006.01) | |
| *B60R 11/02* | (2006.01) | |
| *B29C 45/16* | (2006.01) | |
| *B60R 11/00* | (2006.01) | |
| *B29K 23/00* | (2006.01) | |
| *B29C 45/34* | (2006.01) | |
| *B29K 705/00* | (2006.01) | |

(52) U.S. Cl.
CPC .......... *B60R 11/02* (2013.01); *B29C 45/1671* (2013.01); *B29C 45/14065* (2013.01); *B29C 45/1676* (2013.01); *B29C 45/34* (2013.01); *B29C 2045/14114* (2013.01); *B29C 2045/14131* (2013.01); *B29K 2023/12* (2013.01); *B29K 2705/00* (2013.01); *B60R 2011/0059* (2013.01)

(58) Field of Classification Search
None
See application file for complete search history.

(56) References Cited

U.S. PATENT DOCUMENTS

| | | | | |
|---|---|---|---|---|
| 3,141,054 A | * | 7/1964 | Francis | H01R 43/24 264/255 |
| 3,668,779 A | * | 6/1972 | Turner | H01R 24/28 264/263 |
| 8,673,195 B2 | * | 3/2014 | Gillard | B29C 45/14836 264/250 |
| 8,851,350 B2 | * | 10/2014 | Liao | F16M 13/022 224/197 |
| 2008/0122137 A1 | * | 5/2008 | Hamaoka | B29C 45/14688 264/255 |
| 2012/0219748 A1 | * | 8/2012 | Gillard | B29C 45/14836 428/76 |
| 2015/0049295 A1 | * | 2/2015 | Larson | B29C 45/1642 351/117 |

* cited by examiner

*Primary Examiner* — Edmund Lee
(74) *Attorney, Agent, or Firm* — Cheng-Ju Chiang

(57) ABSTRACT

A manufacturing method for a hanging structure of a hands-free mount is disclosed. The hands-free mount includes a mount body and a hanging arm. The mount body is formed by a bottom shell and a top shell coupled mutually. The hanging arm includes a metal substrate and inner and outer coatings wrapping the metal substrate. The outer coating has a chamfered end located outside the bottom shell and inclined at an angle. The manufacturing method for the hanging structure of the hands-free mount uses an over-molding process to fully wrap the stainless steel core, so as to endow the hanging structure with good appearance and soft touch and prevent the product from rusting. Using the hanging structure as the hanging arm, the hands-free mount has improved firmness, appearance and touch.

3 Claims, 13 Drawing Sheets

MANUFACTURING METHOD FOR A HANGING STRUCTURE OF A HANDS-FREE MOUNT

BACKGROUND OF THE INVENTION

1. Technical Field

The present invention relates to a hands-free mount and a manufacturing method for a hanging structure thereof. More particularly, the hands-free mount is a bracket for conveniently securing a hands-free device onto a surface in a vehicle, and the manufacturing method is useful to endow the hanging structure of the hands-free mount with improved firmness, appearance and touch.

2. Description of Related Art

One conventional hands-free mount 90, as depicted in FIG. 1, includes a mount body 91 for holding a portable device, such as a mobile phone and a hook 92 for positioning the mount body 91 with respect to a surface in a vehicle. The hook 92 is of a U-like shape integrally composed of a fixed segment 921, a bent segment 922 and an expandable segment 923. The fixed segment 921 is fixed to a rear surface (outer side) 911 of the mount body 91, and the expandable segment 923 can expand under a pulling force for gripping any suitable article, thereby fixing the hands-free mount 90 in position.

Conventionally, the hook 92 of the hands-free mount 90 is made of metal because metal provides malleability and corrosion resistance, such desirable characteristics that a device needs. However, a metal hook is visually cold, stiff and toneless, and fails to provide a soft and comfortable sense of touch. In addition, although the existing hook 92 is capable of fixing the hands-free mount 90 to external articles, some defects thereof have been observed. Particularly, when the expandable segment 923 is pulled to expand, the resulting stress first acts on the bent segment 922 before conveyed to the fixed segment 921. Consequently, the bent segment 922 tends to break under the focused stress, making the fixed segment 921 separate from the rear surface 911 of the mount body 91, which causes the whole hands-free mount 90 to become unusable. Furthermore, as known, the gripping capacity of a hook is subject to its radian. Since the bent segment 922 of the hands-free mount 90 is limited in terms of radian, its operation is relatively limited and inconvenient.

SUMMARY OF THE INVENTION

One objective of the present invention is to provide a hands-free mount featuring for excellent firmness and appearance.

Another objective of the present invention is to provide a manufacturing method for a hanging structure of a hands-free mount, wherein the method uses an over-molding process to fully wrap a stainless steel core. In the over-molding process, following a first molding step for positioning the stainless steel core with polypropylene resin, a second molding step is performed to inject thermoplastic elastomer with the presence of venting inserts for ensuring good venting. Thereby, the close combination between PP and TPE can perfectly wrap the stainless steel core, so as to endow the hanging structure of the hands-free mount with good appearance and soft touch and prevent the product from rusting.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Referring to FIGS. 7A to 9, a manufacturing method for a hanging structure of a hands-free mount is illustrated according to one embodiment of the present invention. As shown, the manufacturing method for making the hanging structure comprises: an inserting step 1, a positioning step 2 and a wrapping step 3. Therein, the inserting step 1 involves placing a to-be-wrapped stainless steel core 4 into a forming mold 5. The to-be-wrapped stainless steel core 4 is made of SUS 301 and preformed with a plurality of windows 40. Also placed into the forming mold 5 are venting inserts (not shown). The venting inserts are positioned near a rear end of the to-be-wrapped stainless steel core 4. The forming mold 5 is such closed that the windows 40 are exposed outside so that the windows 40 can act as positioning points during the manufacturing method, and can later act as structure by which the hanging structure is fixed to the hands-free mount. The positioning step 2 injects polypropylene resin (hereinafter referred to as PP) as a support, and the to-be-wrapped stainless steel core 4 can later act as an ejector for easy demolding. The highly heated mold 5 in this step tightly attaches the injected PP at a demolding position of the to-be-wrapped stainless steel core 4 The wrapping step 3, as a second molding step, involves injects thermoplastic elastomeric (hereinafter referred to as TPE) to fully wrap the to-be-wrapped stainless steel core 4 with the injected TPE. In this step, since the venting inserts ensure good venting, the undesired undershot can be prevented. The foregoing over-molding process thus provides good positioning, wrapping and venting performance, thereby ensuring close combination between the PP and TPE parts that fully wraps the to-be-wrapped stainless steel core, so as to endow the hanging structure of the hands-free mount with good appearance and soft touch and prevent the product from rusting.

Figure 8A:
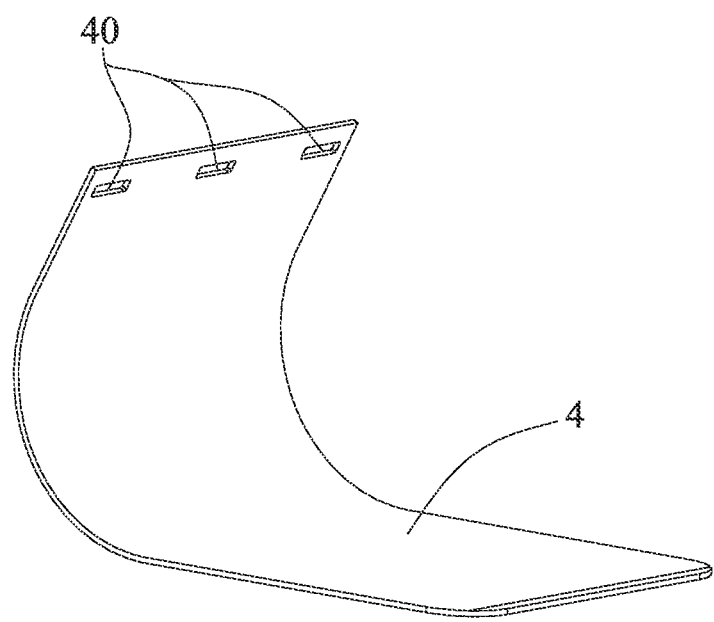
FIGS. 8 A to 8C depict products of the steps shown in FIG. 7A through 7C, respectively.
Figure 8B:
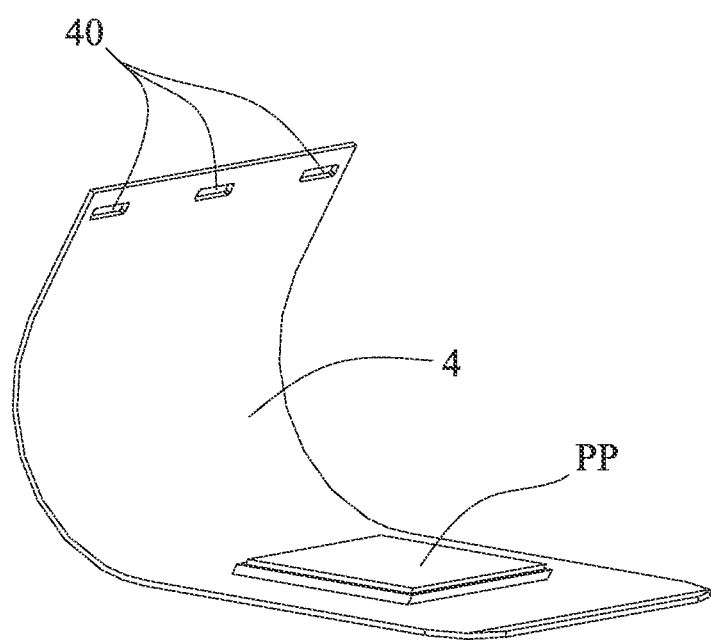
Figure 8C:
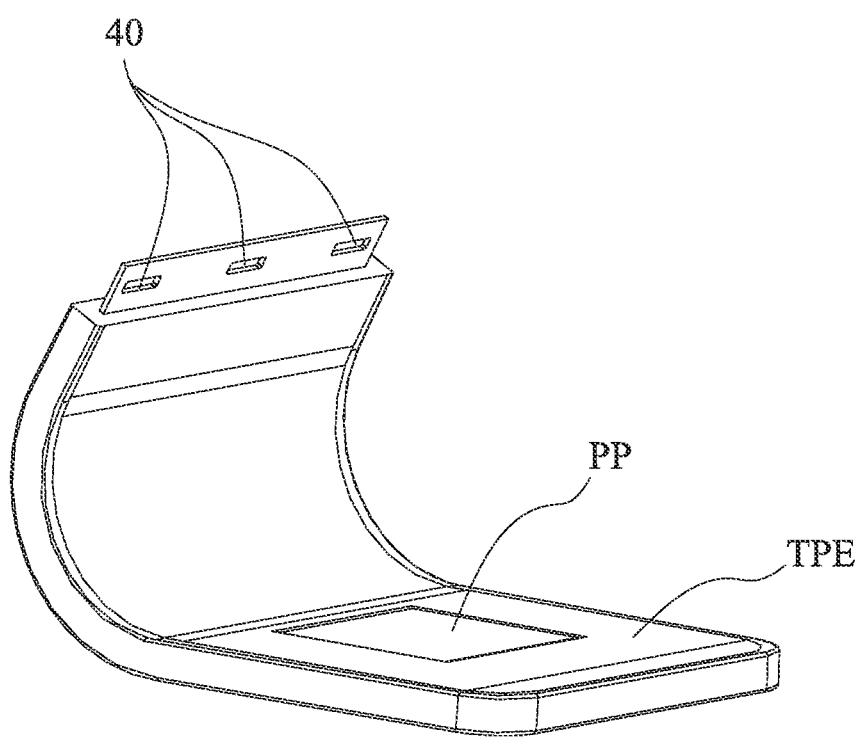
Figure 9:
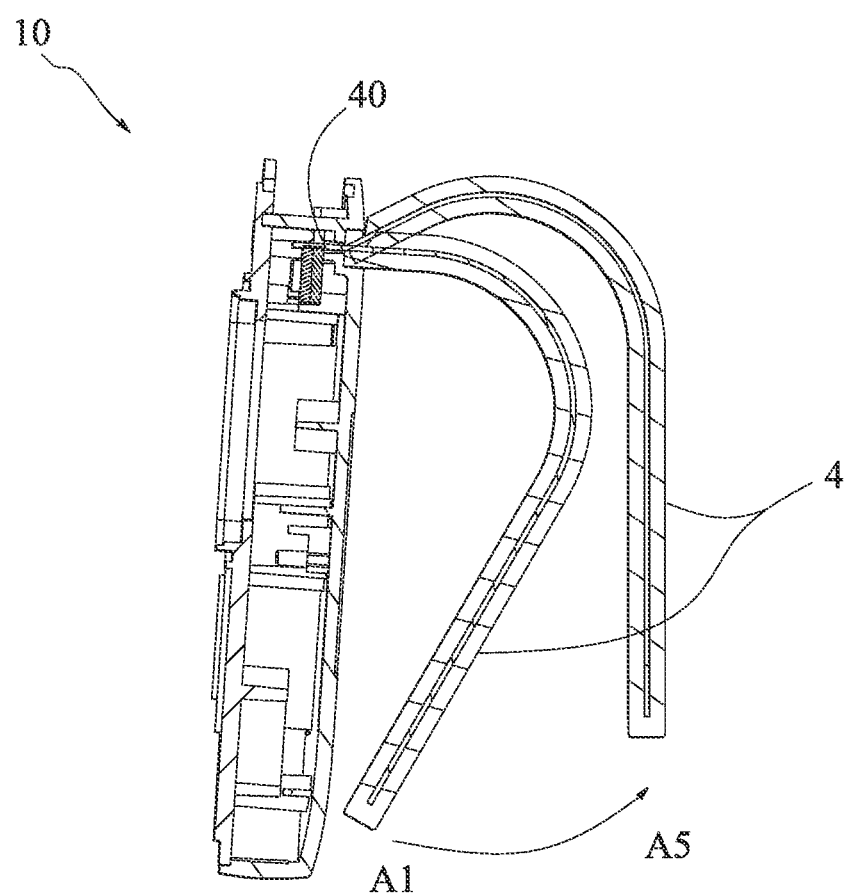
FIG. 9 is an applied view of the hanging structure that is assembled to the hands-free mount.

Referring to FIGS. 8A to 8C, the present invention uses the first molding step to inject and tightly attach PP to the to-be-wrapped stainless steel core 4 for the purpose of positioning, and then uses the second molding step where good venting is provided to fully wrap the to-be-wrapped stainless steel core 4 with TPE, so the resulting product has good appearance and soft touch and is prevented from rusting. Now referring to FIG. 9, the stainless steel core 4 such wrapped is assembled to a hands-free mount 10 through its plural windows 40. As shown, the fully wrapped stainless steel core 4 acts as the hanging structure of the hands-free mount 10. The hanging structure so provided has excellent gripping ability, and in virtue of the coat formed by PP and TPE, presents soft appearance and soft touch. Meanwhile, as shown in FIG. 9, the underlying stainless steel core allows the hanging structure to deform from A1 to A5, enabling the hands-free mount 10 to grip articles with thickness of a larger range.

Figure 1:
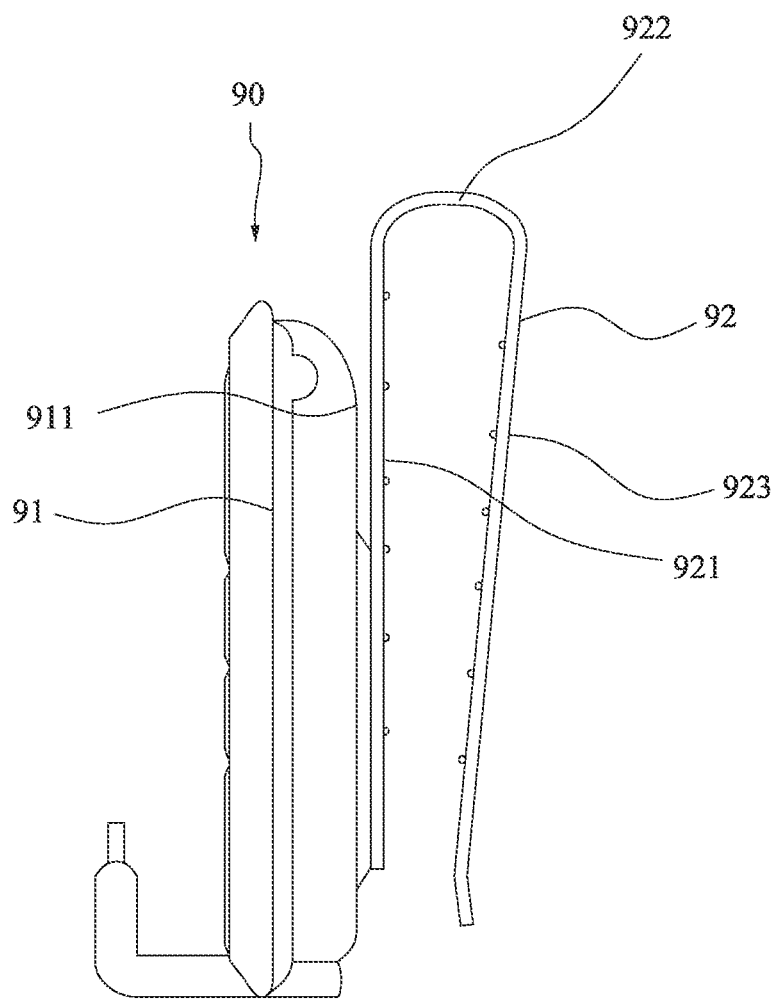
FIG. 1 is a lateral view of a conventional hands-free mount.
Figure 2:
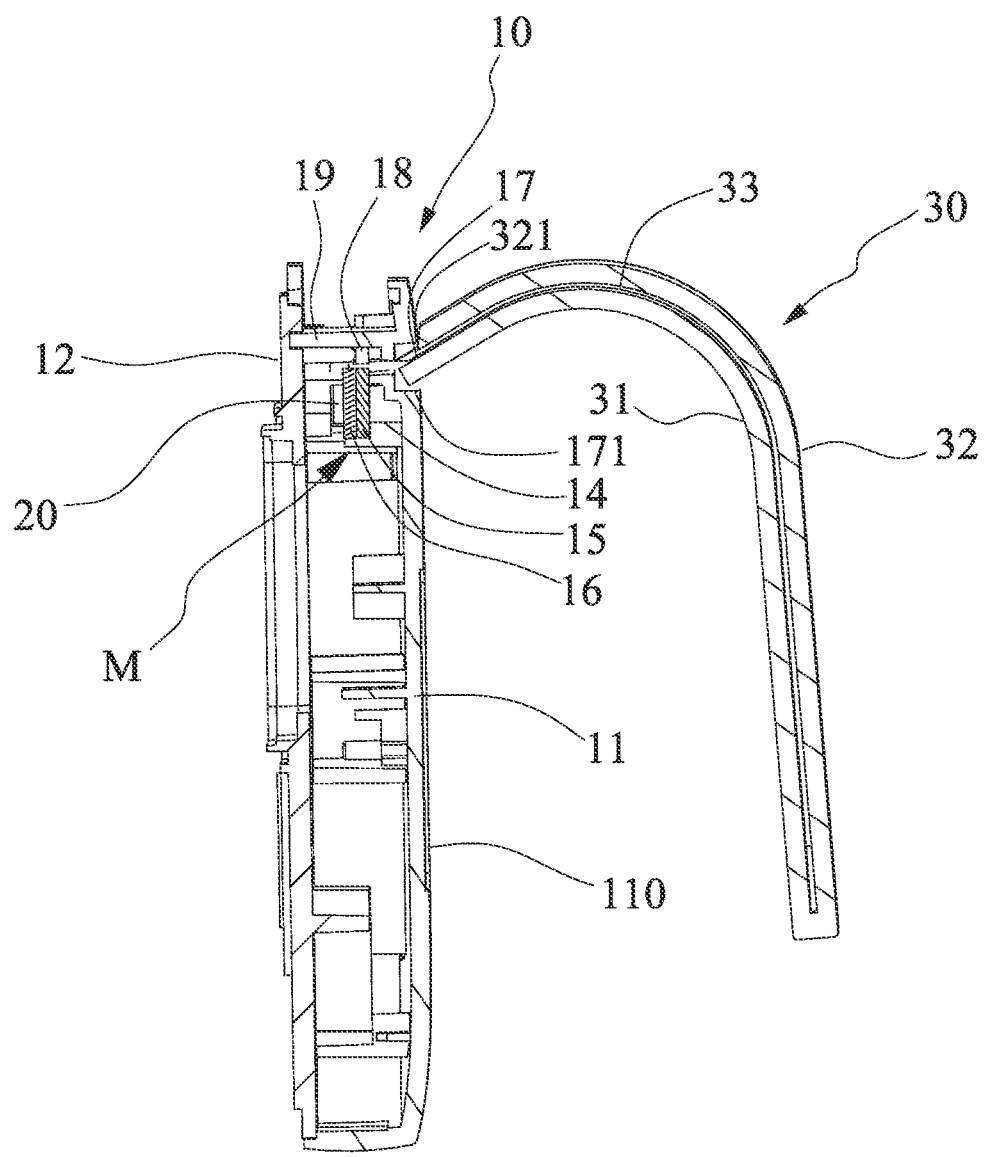
FIG. 2 is a lateral cross-sectional view of a hands-free mount according to the present invention.
Figure 3:
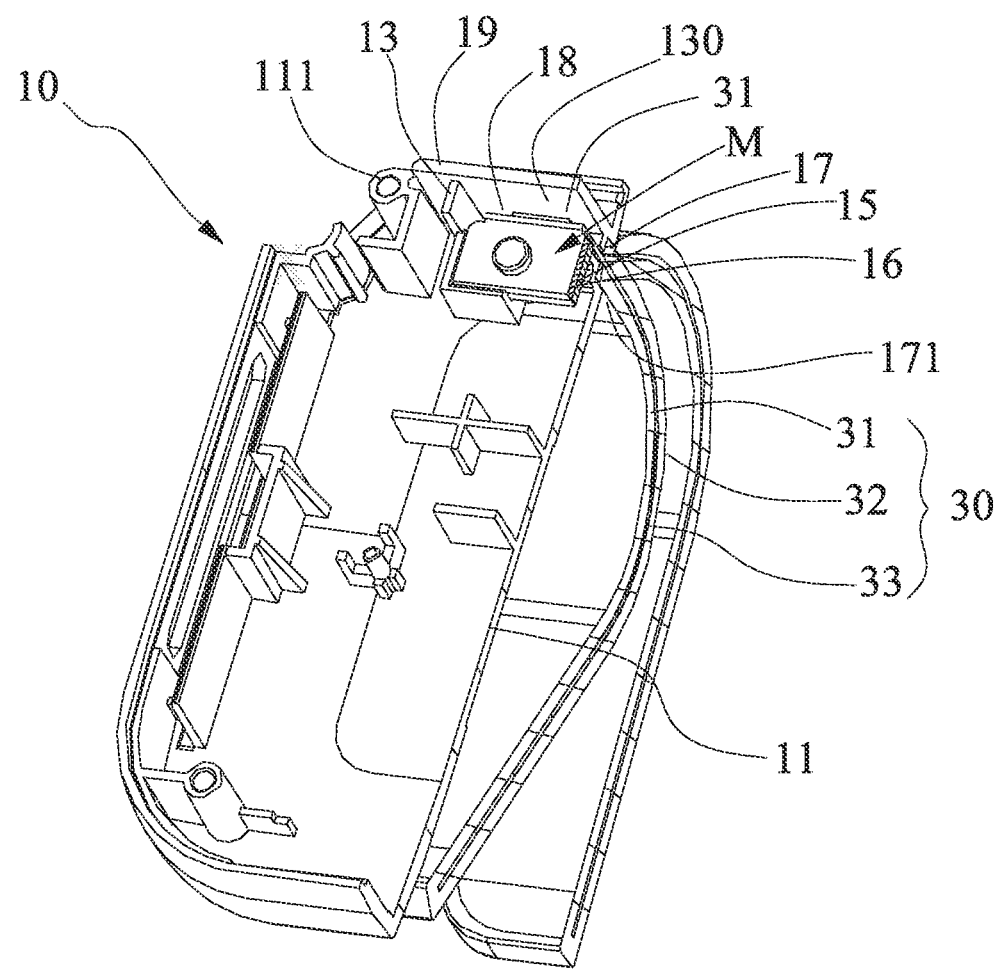
FIG. 3 is a cut-away, perspective cross-sectional view of the hands-free mount according to the present invention.
Figure 4:
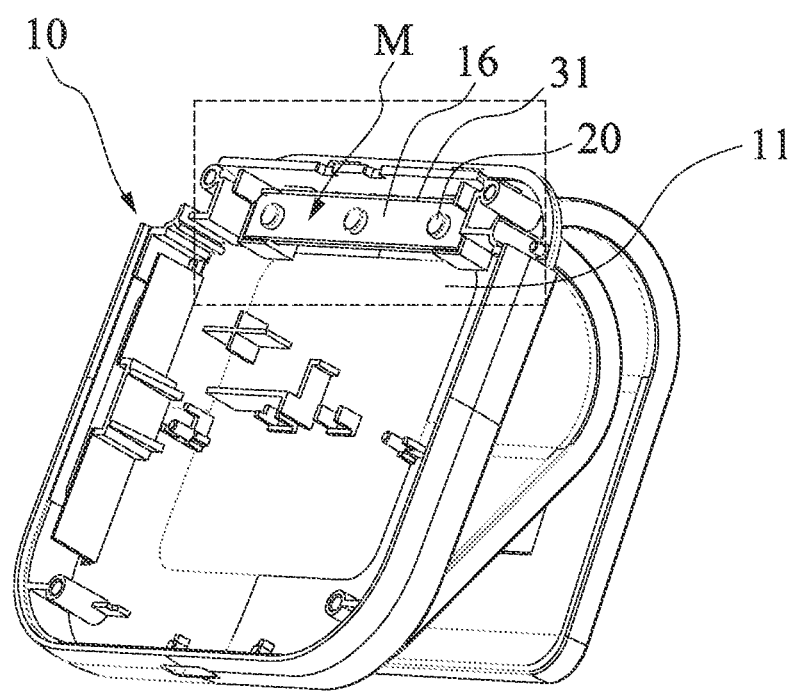
FIG. 4 is a schematic drawing showing the hands-free mount of the present invention posed inclined.

Please refer to FIGS. 2 to 4 as well. The hands-free mount of the present invention comprises a mount body 10 and a hanging arm 30 (i.e. the hanging structure made from the foregoing inventive manufacturing method). The mount body 10 has a bottom shell 11 and a top shell 12. A pair of retaining plates 13 is formed inside and along one edge of the bottom shell 11 to define therebetween a positioning space 130. In the positioning space 130, a plurality of threaded holes 14 are provided. The positioning space 130 receives a metal positioning member M that is composed of a first positioning piece 15 located lower and a second positioning piece 16 located higher. The first positioning piece 15 and the second positioning piece 16 are bored so that screws 20 can pass therethrough and get coupled with the threaded holes 14 thereunder. The bottom shell 11 at its side near the metal positioning member M is formed with a slot 17 and a recess 171, such that the recess 171 is below the metal positioning member M and does not penetrated through the bottom shell 11. Beyond the positioning space 130, two third positioning pieces 18 made of metal are installed in the bottom shell 11. The third positioning pieces 18 have a height (thickness) approximately equal to that of the first positioning piece 15. In addition, the bottom shell 11 has a cover 19 that extends along its edge and is adjacent to the third positioning piece 18. The bottom shell 11 is also formed with a plurality of positioning holes 111 for allowing the top shell 12 to couple therewith.

Figure 6:
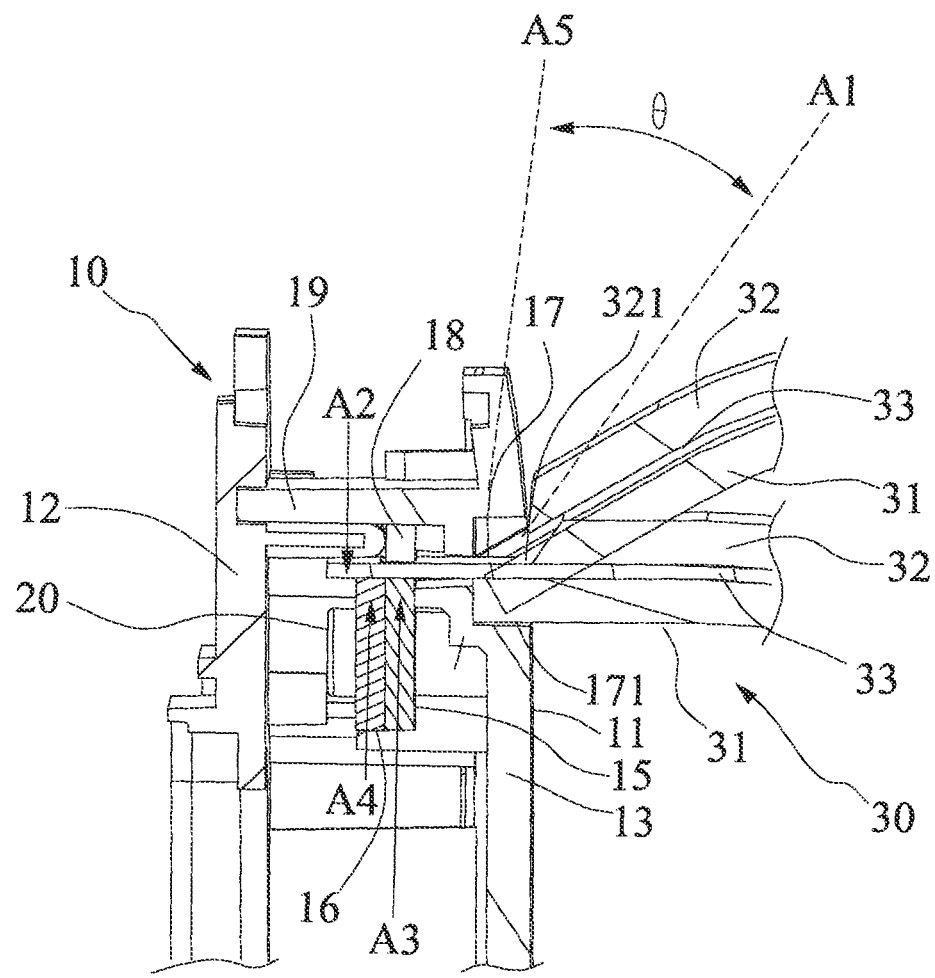
FIG. 6 is a schematic drawing partially showing the hands-free mount of the present invention in operation.
Figure 7A:
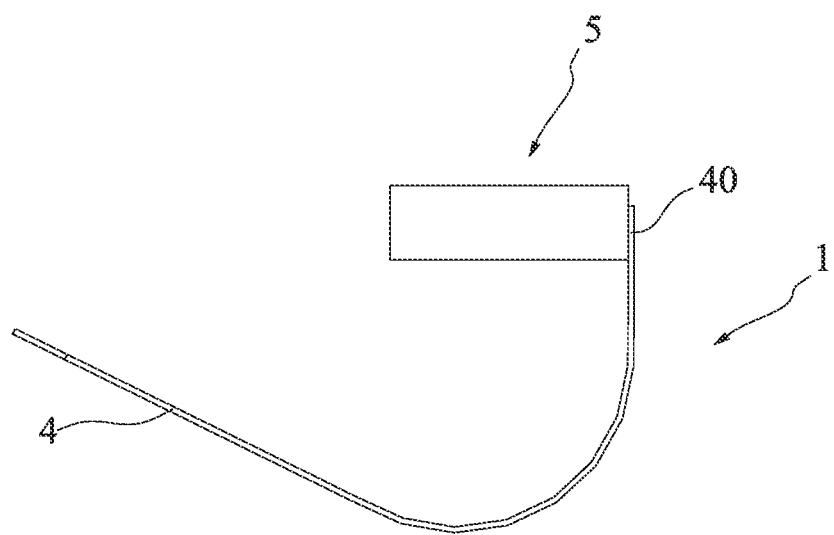
FIG. 7A to 7C illustrate steps in an over-molding process for making a hanging structure of a hands-free mount as disclosed herein.
Figure 7B:
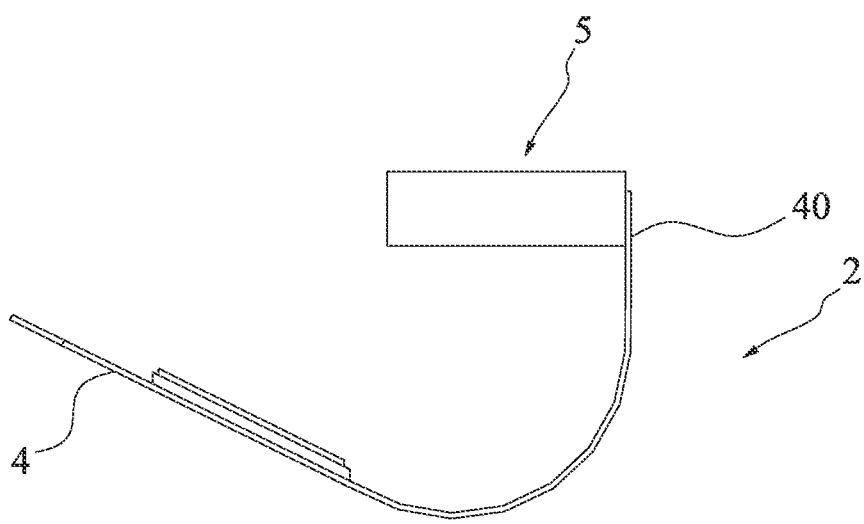
Figure 7C:
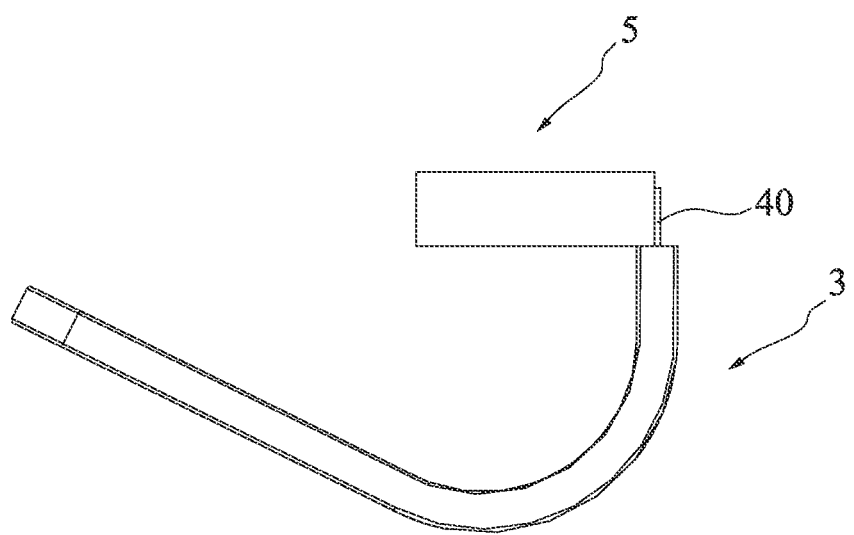

The hanging arm 30 is a curved body that includes a metal substrate 33 on which a plastic inner coating 31 and a plastic outer coating 32 are made (i.e. the hanging structure made from the foregoing inventive manufacturing method). The metal substrate 33 has its front end inserted into the slot 17 and retained in the bottom shell 11 so that the front end of the metal substrate 33 is firmly positioned between the first and second positioning pieces 15, 16 of the metal positioning member M and the third positioning piece 18. The front end of the inner coating 31 is inserted into the recess 171 and thereby fixed to the bottom shell 11. The front end of the outer coating 32 is formed as a chamfered end 321. The chamfered end 321 stays outside the bottom 110 of the bottom shell 11 and is inclined at an angle of θ (as shown in FIG. 6). In preferred embodiments of the present invention, the chamfered end 321 does not normally contact the bottom 110.

Figure 5:
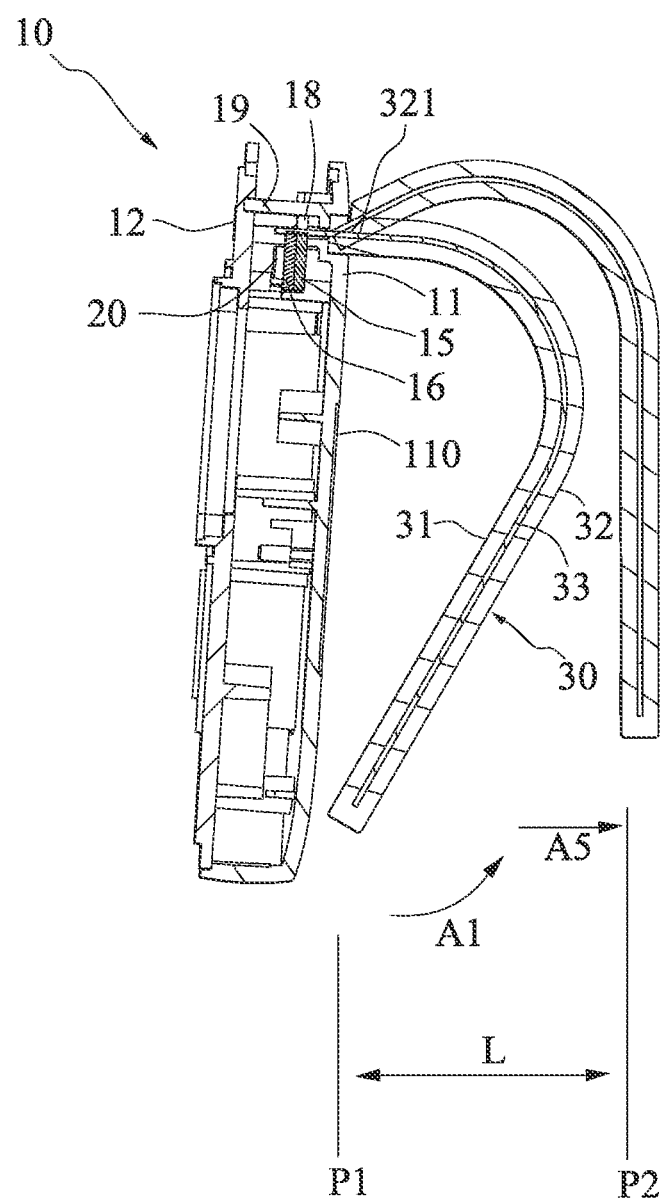
FIG. 5 is a schematic drawing showing operation of the hands-free mount of the present invention.

Also seeing FIGS. 5 and 6, in use, the hanging arm 30 receives a pulling force A1 for expanding it (as shown in FIG. 5). The pulling force A1 applies a force A2 to the front end of the metal substrate 33 (as shown in FIG. 6). In response, the first positioning piece 15 generates a first counterforce A3 (as shown in FIG. 6) to resist it. When the counterforce A3 from the first positioning piece 15 becomes greater than the force A2 acting on the metal substrate 33, a change in terms of angle happens, and then the second positioning piece 16 generates a counterforce A4 (as shown in FIG. 6). Afterward, continuous application of the pulling force A1 can lead to a pulling force A5 (as shown in FIG. 5).

Referring to FIG. 5, when the minimum pulling force A1 is applied, the minimum interaction distance of the hanging arm 30 is P1. When the pulling force increases from A1 to A5, the maximum interaction distance of the hanging arm 30 is P2. A difference between P2 and P1 is L, which is the maximum bearable thickness. With the approach to the maximum bearable thickness L, the inclined angle θ of the chamfered end 321 of the outer coating 32 becomes closer to 0, where the chamfered end 321 closely contact the bottom of the bottom shell 11. In other words, the maximum bearable thickness L is adjustable by changing the angle θ.

Thereby, the disclosed hanging arm 30 can have improved flexibility before its material has stress-activated deformation, thereby improving its gripping capability. Hence, by properly designing the angle θ, the desired maximum bearable thickness L can be achieved. Furthermore, the hanging arm 30 with the disclosed configuration has improved structural firmness in addition more preferable appearance and touch.

What is claimed is:

1. A manufacturing method for a hanging structure of a hands-free mount, the method including:
    an inserting step, wherein a to-be-wrapped stainless steel core that is preformed with a plurality of windows is placed into a forming mold, and the forming mold is closed such that the windows are exposed outside the forming mold;
    a positioning step, wherein polypropylene resin is injected to the forming mold so that the forming mold makes the polypropylene resin tightly attached to the to-be-wrapped stainless steel core; and
    a wrapping step, wherein thermoplastic elastomer is injected to fully wrap the to-be-wrapped stainless steel core with the polypropylene resin thereon;
    wherein the manufacturing method uses an over-molding process composed by the positioning step and the wrapping step to make the to-be-wrapped stainless steel core fully wrapped.

2. The manufacturing method of claim 1, wherein the stainless steel core is made of SUS 301.

3. The manufacturing method of claim 1, wherein the polypropylene resin is tightly attached to the to-be-wrapped stainless steel core at a demolding position of the to-be-wrapped stainless steel core.

* * * * *